United States Patent
Estebanez et al.

(10) Patent No.: US 6,843,755 B2
(45) Date of Patent: Jan. 18, 2005

(54) POWER MANAGEMENT SYSTEM

(75) Inventors: Gareth John Estebanez, Peoria, IL (US); David Langsford Collins, Normal, IL (US); Brian Eugene Lister, Edwards, IL (US); James B. Maddock, Washington, IL (US); Larry Ellis Kendrick, Peoria, IL (US); Robert Urban Murray, Peoria, IL (US); Kevin Adam Vernagus, Bloomfield, MI (US); Timothy Alan Lorentz, Morton, IL (US); Satish Yadav, Peoria, IL (US); Sridhar Deivasigamani, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/357,396

(22) Filed: Feb. 4, 2003

(65) Prior Publication Data

US 2003/0186780 A1 Oct. 2, 2003

Related U.S. Application Data

(60) Provisional application No. 60/367,491, filed on Mar. 27, 2002.

(51) Int. Cl.[7] .............................................. B60K 41/04
(52) U.S. Cl. ...................................................... 477/107
(58) Field of Search ........................................ 477/107

(56) References Cited

U.S. PATENT DOCUMENTS

| | | | | |
|---|---|---|---|---|
| 4,200,007 A | * | 4/1980 | Espenschied et al. ....... | 477/110 |
| 4,355,550 A | * | 10/1982 | Will et al. ................... | 477/102 |
| 4,403,527 A | * | 9/1983 | Mohl et al. ................... | 477/32 |
| 4,493,228 A | * | 1/1985 | Vukovich et al. ........... | 477/109 |
| 4,593,580 A | * | 6/1986 | Schulze ....................... | 477/109 |
| 4,938,100 A | * | 7/1990 | Yoshimura et al. ......... | 477/101 |
| 5,239,894 A | * | 8/1993 | Oikawa et al. ............. | 477/107 |
| 5,385,516 A | * | 1/1995 | Grange et al. ............. | 477/107 |
| 5,441,464 A | * | 8/1995 | Markyvech ................. | 477/109 |
| 5,583,766 A | * | 12/1996 | Birchenough et al. ........ | 701/51 |

* cited by examiner

Primary Examiner—Dirk Wright
(74) Attorney, Agent, or Firm—Finnegan, Henderson, Farabow, Garrett & Dunner; Steven M Hanley

(57) ABSTRACT

An exemplary power management system may include a power source and a transmission. The transmission may include a drive member and at least two shift ranges. The drive member may be driveably engaged with the power source. The power management system may also include a control system in communication with the power source and the transmission. The control system may be operative to cause a shift transition between the at least two shift ranges in response to a shift command. The control system may also be operative, during at least a portion of the shift transition, to modify at least one of a speed of the drive member and a speed of the power source based on at least one of a load condition of the power source, a speed of the power source, and the at least two shift ranges.

20 Claims, 7 Drawing Sheets

POWER MANAGEMENT SYSTEM

RELATED APPLICATION

This application claims the benefit of priority from U.S. Provisional Application No. 60/367,491, filed on Mar. 27, 2002 which is incorporated herein by reference.

TECHNICAL FIELD

This invention relates generally to an integrated engine and transmission control system and, more particularly, to a power management system for improving shift quality of the integrated engine and transmission control system.

BACKGROUND

Traditional automatic transmission controls effect power-shift gear changes in accordance with a preselected shift map, e.g., at specified ground speeds, even if the engine is at full speed and full throttle and regardless of the engine load and shift being performed. For example, U.S. Pat. No. 6,254,509 discloses a power shift transmission driven by an electronically-controlled engine and a control system that momentarily modifies a magnitude of an engine throttle command signal during a shift of the power shift transmission. The momentary modification occurs independent of the engine load and the shift being performed.

Gear changes according to this method are inefficient and result in excessive wear to driveline components and unacceptable shift quality. For example, a downshift of the transmission may require acceleration of one or more components of the transmission, for example, the countershaft, even though the overall power output is more greatly reduced across the transmission as a result of the downshift. As a result, the engine may lug during the downshift or, if the engine is already lugged back, the downshift may result in an engine stall.

Moreover, the transmission clutches are required to absorb the change in kinetic energy stored in the system and the energy generated by the engine during the gear changes. Additionally, such systems can exhibit excessive shift shock when the new gear is engaged due to the difference between the engine speed and the transmission speed in the new gear.

The subject invention is directed to improving shift quality by minimizing shift acceleration and delay while ensuring that the acceleration, delay, and engine response during shifting meet with operator expectations.

SUMMARY OF THE INVENTION

In accordance with one aspect of the invention, an exemplary power management system may include a power source and a transmission. The transmission may include a drive member and at least two shift ranges. The drive member of the transmission may be driveably engaged with the power source. The power management system may also include a control system in communication with the power source and the transmission. The control system may be operative to cause a shift transition between the at least two shift ranges in response to a shift command. The control system may be operative to modify, during at least a portion of the shift transition, at least one of a speed of the power source and a speed of the drive member based on at least one of a load condition of the power source, a speed of the power source, and the at least two shift ranges.

According to another aspect of the invention, an exemplary method for operating a power management system may include driving a transmission with a power source, wherein the transmission has at least two shift ranges. The method may also include controllably shifting between the at least two shift ranges in response to a shift command and modifying, during at least a portion of the shift transition, at least one of a speed of the power source and a speed of the drive member based on at least one of a load condition of the power source, a speed of the power source, and the at least two shift ranges.

According to yet another aspect of the invention, an exemplary vehicle having a power management system may include an engine and a transmission including a countershaft and at least two shift ranges. The countershaft of the transmission may be driveably engaged with the engine. The vehicle may also include at least one controller in communication with the engine and the transmission, wherein the at least one controller may be operative to cause a shift transition between the at least two shift ranges in response to a shift command. The at least one controller may be operative, during at least a portion of the shift transition, to increase net torque available to the countershaft by increasing the speed of the engine. The at least one controller may also be operative, during at least a portion of the shift transition, to increase the speed of the engine by increasing fuel delivery to the engine and increasing a fuel torque limit on the fuel delivery based on at least one of a load condition of the engine, a speed of the engine, and the at least two shift ranges.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
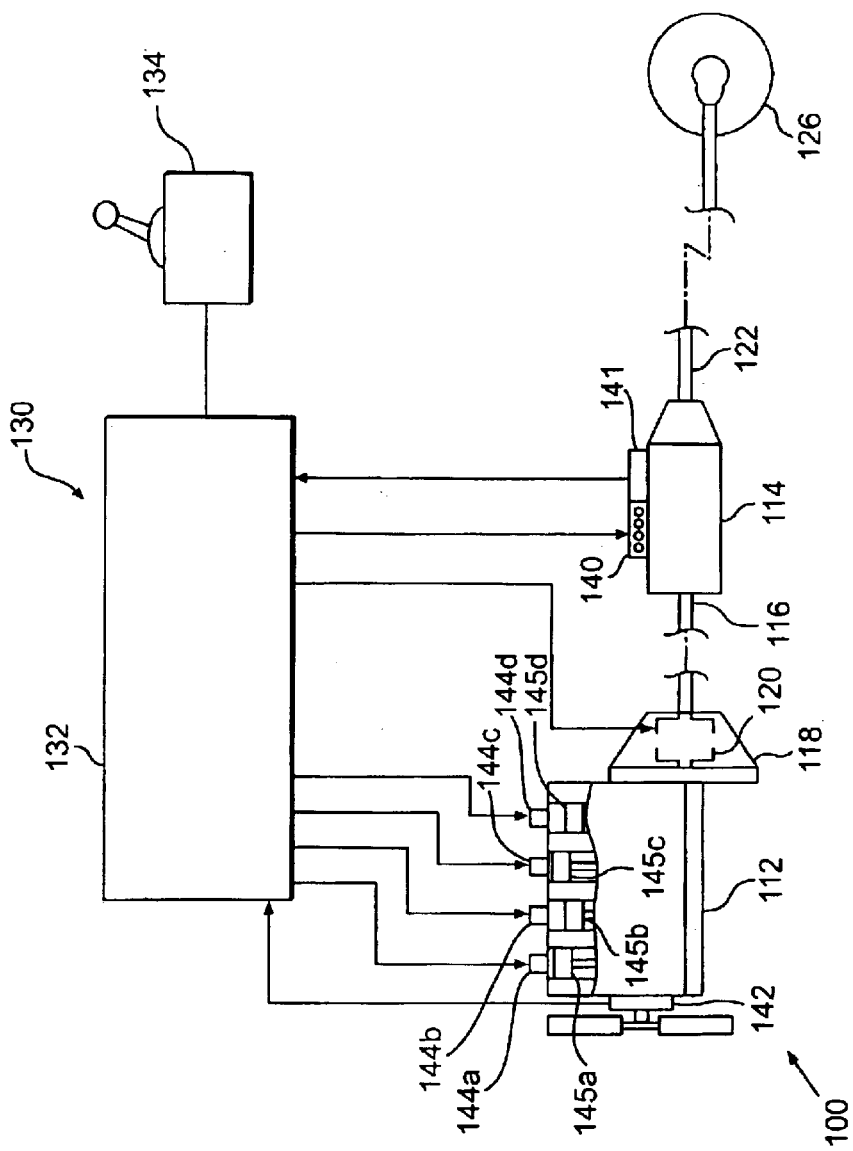
FIG. 1 is a schematic illustration of an exemplary power management system in accordance with the present invention.

Referring to FIG. 1, an exemplary embodiment of the present invention will be described. FIG. 1 is a schematic illustration of an exemplary power management system 100 to which the present invention can be applied. The power management system 100 may be equipped with a power source 112 such as, for example, an engine, and a transmission 114, for example, an automatic transmission. The transmission 114 may have neutral, a plurality of forward gear ratios, and one or more reverse gear ratios; however, it can readily be adapted to different transmission configurations, as would be apparent to one skilled in the art.

The transmission 114 may include a drive member 116, for example, a countershaft, connected to and driven by the engine 112 through a torque converter 118 equipped with a lockup clutch 120. The output of the transmission 114 may be connected to and configured to rotatably drive a shaft 122. The shaft 122 may in turn be connected to and configured to drive a ground engaging wheel 126, thereby propelling the vehicle. In this manner, engine torque or power may be transmitted to the wheel 126 with a predetermined speed ratio.

A control system 130 may include an engine and transmission controller 132 embodied in a single microprocessor. Numerous commercially available microprocessors can be adapted to perform the functions of the engine and transmission controller. It should be appreciated that engine and transmission controllers could readily be embodied in separate microprocessors adapted to communicate via a data link without departing from the scope of the exemplary embodiment.

The controller 132 may be configured to receive inputs including a vehicle speed signal from, for example, a control lever mechanism 134, for example, an operator-controlled lever, and effect gear changes in the transmission 114 in response to the received signals and in accordance with a predetermined shifting strategy, as is known in the art. For this purpose, the transmission 114 may be provided with upshift and downshift solenoids 140. The controller 132 may selectively deliver control signals to these solenoids to initiate gear change operations. Actuation of one of the shift solenoids 140 displaces a rotary selector valve (not shown) to a position corresponding to the new shift range. When the selector valve is repositioned in this manner, the transmission may automatically disengage the old shift range and engage the new shift range, as is common in the art. The controller 132 may be electrically connected to the lockup clutch 120 for controlling its engagement and disengagement during shifting.

A gear selector (not shown) may be provided for indicating a desired transmission gear ratio and direction of travel. It should be appreciated that the gear selector can be embodied in any device or combination of devices capable of providing an electrical signal for indicating a desired gear ratio and direction of travel. For example, the gear selector can be in the form of movable lever having a neutral position and a plurality of forward gear positions and reverse position. A sensor (not shown), such as a switch or potentiometer, may be adapted to sense the position of the gear selector and produce a desired gear signal responsive to the selector's position. The desired gear signal may be supplied to the controller 132. As vehicle speed increases, the controller 132 effects gear shifting in accordance with a preset shift map until the desired gear is reached.

An actual gear sensor 141 may be provided for sensing the actual transmission gear ratio and producing an actual gear ratio signal. Optionally, the sensor 141 may be in the form of a combination of switches, which produce a unique code for each transmission gear ratio as would be appreciated by one skilled in the art. The controller 132 may have an input adapted to receive the actual gear ratio signal.

The controller 132 may be adapted to receive operating parameters including an operator desired speed signal and an actual engine speed signal and responsively regulate engine speed in a closed-loop control. For this purpose, the control system may include a pedal position sensor (not shown) adapted to produce an electrical signal responsive to the position of the vehicle's accelerator pedal (not shown). Additionally, the control system may include an engine sensor 142 adapted to sense engine speed and produce an engine speed signal. Optionally, the engine speed sensor 142 may be in the form of a magnetic pick-up sensor adapted to produce a signal corresponding to the rotational speed of the engine 112. The sensor 142 may be capable of determining the speed, angular position, and direction of rotation of a rotatable shaft.

The controller 132 may process the received signals to produce a fuel injection control signal for regulating the fuel delivery to the engine 112 in response to a difference between a desired engine speed signal and the actual engine speed signal and in accordance with engine control maps, for example, rail pressure maps, timing maps, torque limit maps, etc., as is known in the art. Optionally, the actual engine speed may be regulated into correspondence with the desired engine speed using a proportional-integral-differential (PID) control loop. Alternatively, other control strategies such as a proportional-integral control may be employed.

The injection control signal may be delivered to solenoid operated fuel injector units 144a–d associated with individual engine cylinders 145a–d (four shown for illustration purposes) of the engine 112. The duration of the injection control signal corresponds to the on-time of the solenoid, thereby controlling the duration for which the injector 144a–d delivers fuel to an associated cylinder 145a–d during the combustion cycle. The solenoid operated fuel injectors may be hydraulically-actuated units, mechanically-actuated units, or any other units known in the art.

As discussed above, a downshift of the transmission 114 of the exemplary power management system 100 may require acceleration of one or more components of the transmission 114, for example, the countershaft 116. Applying Newton's Second Law for rotational motion to the countershaft 116 and the output shaft 122, the following relationship can be written:

$$\delta\omega_2 = \frac{\Sigma T_2 \cdot \delta\omega_1 \ldots J_1}{J_2 \cdot \Sigma T_1}$$

where:

$J_1$ is the effective moment of inertia of the countershaft 116;

$J_2$ is the effective moment of inertia (including rotational moment of inertia and the effect of associated vehicle's mass) of the output shaft 122;

$\Sigma T_1$ is the net torque available to accelerate the countershaft 116;

$\Sigma T_2$ is the net torque (due to drawbar load and/or rolling resistance) attempting to decelerate the output shaft 122;

$\delta\omega_1$ is the required change in countershaft rotational velocity; and $\delta\omega_2$ is the resulting change in output shaft rotational velocity.

From the above equation, it is apparent that an increase in net torque available to accelerate the countershaft 116 ($\Sigma T_1$) will reduce the change in output shaft velocity ($\delta\omega_2$), and thus, the magnitude of shift acceleration. The net torque available to accelerate the countershaft 116 ($\Sigma T_1$) may be increased by increasing the torque output of the engine 112. The torque output of the engine 112 may be increased by increasing delivery of fuel to the engine 112.

Fuel delivery to the engine 112 may be driven by a differential between desired engine speed and actual engine speed. The fuel delivery may, in turn, be limited by a fuel torque limit, designed to prevent engine failure, and a fuel smoke limit, designed to limit undesirable smoke emissions from the engine. In the exemplary power management system 100, fuel delivery to the engine 112 may be increased during at least a portion of a shift by adding a speed offset to increase the speed differential between the desired engine speed and the actual engine speed. As a result, the controller 132 may increase the fuel delivery amount based on the higher perceived speed differential. The fuel delivery to the engine 112 may also be increased by increasing the fuel torque limit momentarily during at least a portion of the shift, while still preventing engine failure.

Figure 2:
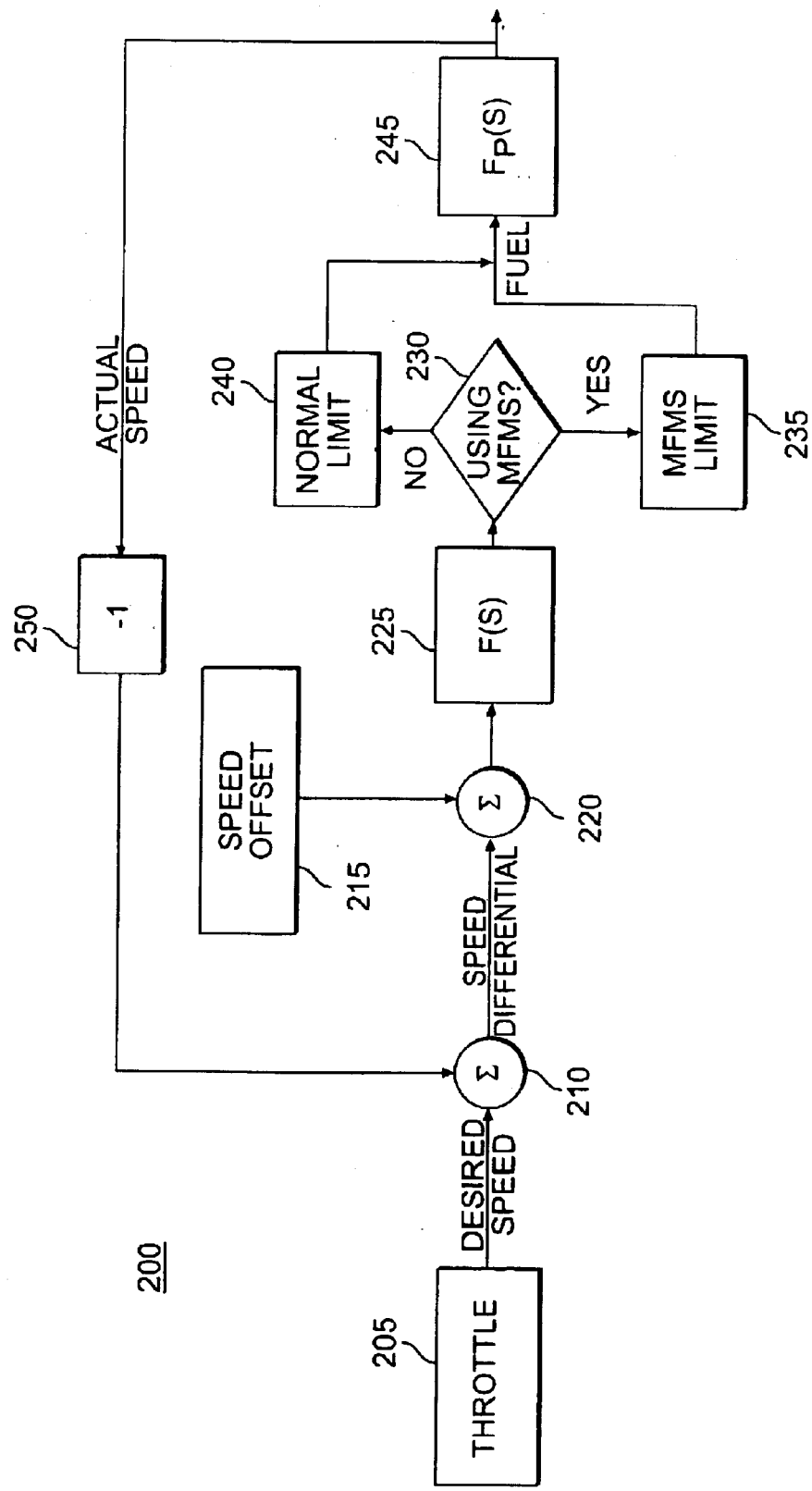
FIG. 2 is a block diagram of an exemplary control system for implementing a power management system in accordance with the present invention.

A block diagram illustrating an exemplary control system 200 for the power management system 100 is shown in FIG. 2. At block 205, the control system 200 receives a throttle input associated with a desired speed of the engine 112. At a first summation block 210, a speed differential between the desired engine speed and the actual engine speed is determined.

Figure 4:
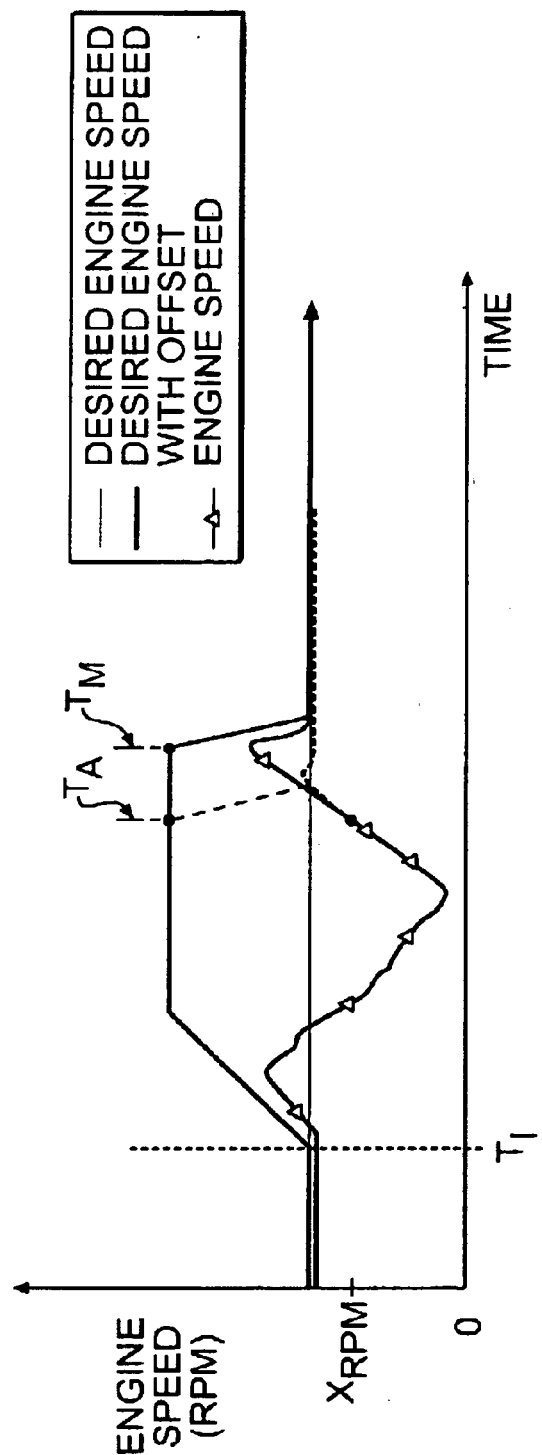
FIG. 4 is a graph illustrating the engine speed response in an exemplary power management system with a speed offset.

The control system 200 includes a modified fuel management system (MFMS) that may be executed, for example, during shifting of the transmission 114. The modified fuel management system may include a speed offset determined at block 215. The speed offset may be zero, for example, when the transmission 114 is not shifting and/or when the modified fuel management system is not being utilized. When the modified fuel management system is being utilized, the speed offset may have a magnitude greater than zero, for example, during at least a portion of a shift. The magnitude of the speed offset may be determined at block 215 based on, for example, vehicle type, desired engine speed, engine load including drawbar load and/or rolling resistance, and/or the shift being performed, for example, a 13-to-12 downshift, a 7-to-6 downshift, or the like. An exemplary speed offset map is shown in FIG. 4 and discussed in more detail below At a second summation block 220, the speed offset may be added to the speed differential. At block 225, an engine controller function (F(s)), which may be handled by the controller 132 of the exemplary power management system 100, determines an amount of fuel to be delivered to the engine 112 based on the result of summation block 220.

Figure 5A:
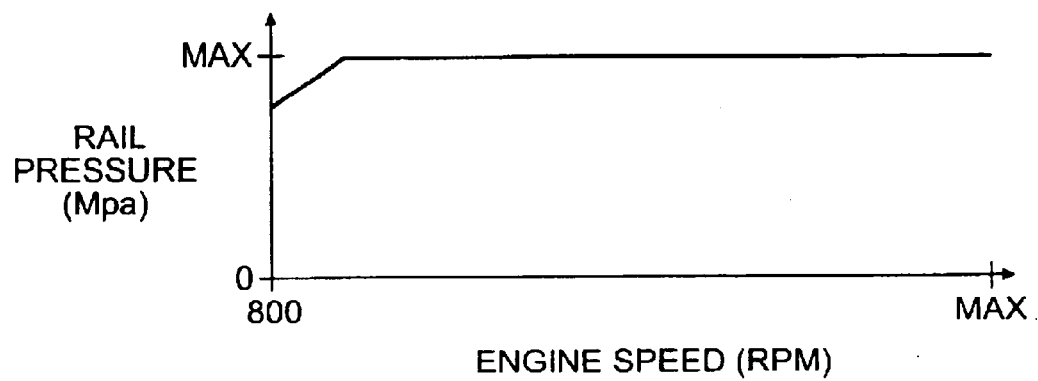
FIGS. 5A, 5B, and 5C are graphs illustrating exemplary modified engine control maps.
Figure 5B:
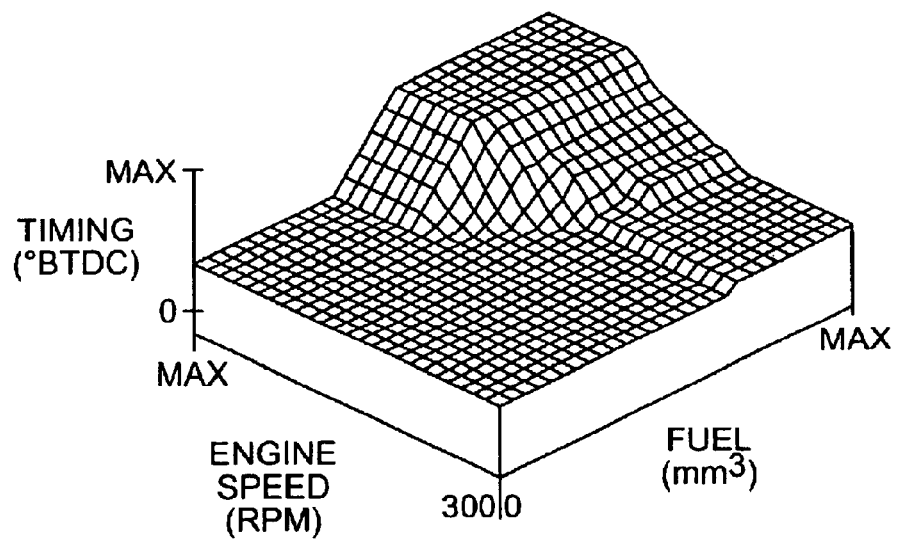
Figure 5C:
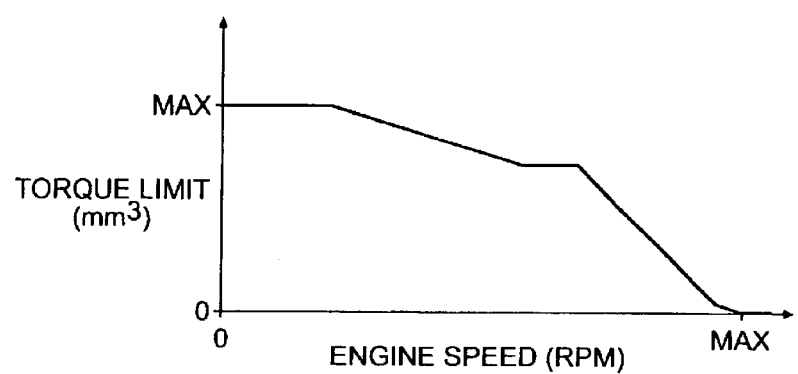

Then, at block 230, the control system 200 determines whether the modified fuel management system is being utilized. If the modified fuel management system is being utilized, a modified fuel torque limit is applied at block 235. Generally, the fuel torque limit provides a limit on the amount of fuel to be delivered to the engine 112 to prevent excessive stress and/or strain on the engine that may cause engine damage and/or failure. The modified fuel torque limit may be greater than a normal fuel torque limit in order to allow the increased fuel delivery to the engine 112 being commanded by the controller function (F(s)) at block 225. An exemplary modified fuel torque limit map is shown in FIG. 5C.

If, at block 230, the control system 200 determines that the modified fuel management system is not being utilized, a normal fuel torque limit is applied at block 240. Once a fuel torque limit is applied at either block 235 or 240, an amount of fuel is delivered to the engine and its associated turbo ($F_p(s)$) at block 245. The resulting engine speed may be sensed and returned to compare with the desired engine speed at summation block 210 via block 250.

The exemplary modified fuel management system incorporated in the block diagram of FIG. 2 may include additional features that may increase fuel delivery to the engine 112, for example, during a shift. For example, in the exemplary fuel management system 100, fuel delivery to the engine 112 may be increased during a shift by advancing the timing of the engine and/or by increasing the desired rail pressure, which is associated with the fuel injection pressure. Exemplary modified timing and rail pressure maps are illustrated in FIGS. 5A and 5B.

Figure 3:
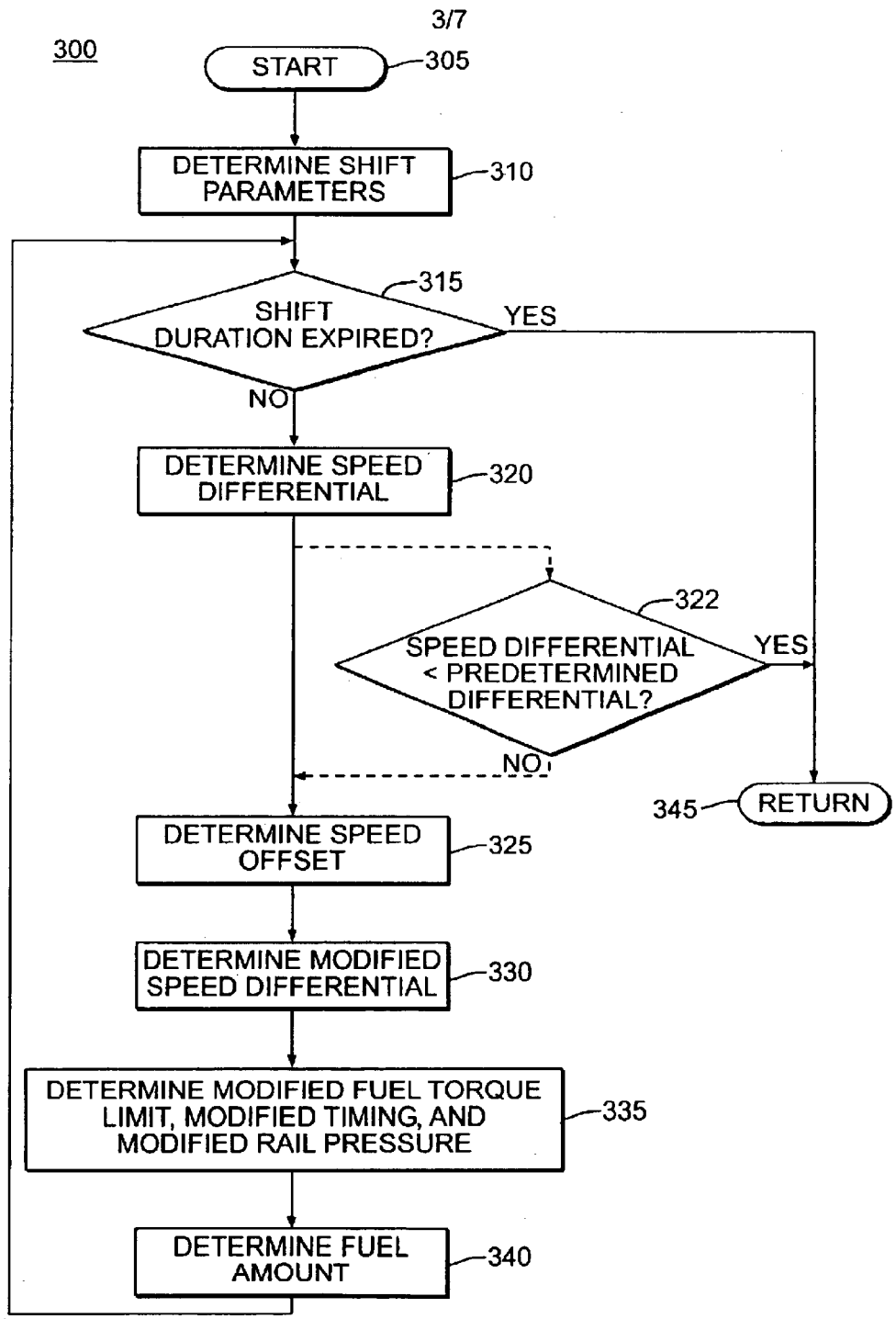
FIG. 3 is a flowchart illustrating an exemplary operation of a power management system in accordance with the present invention.

Referring now to FIG. 3, a shift operation 300 employing a modified fuel management system in accordance with certain aspects of the invention is explained. Control commences in step 305 when the controller 132 determines that a shift between two shift ranges is to occur. Control continues to step 310.

In step 310, the controller 132 determines system parameters to be used during at least a portion of the shift. For example, the controller 132 may determine a maximum speed offset, a speed offset ramp up rate, a speed offset ramp down rate, and/or a speed offset duration. The determinations may be made based on the shift to be performed and the actual engine load, including drawbar load. Control continues to step 315.

Then, in step 315, the controller 132 determines whether the shift duration has expired. If, in step 315, it is determined that the shift duration has not expired, control continues to step 320. If, in step 315, it is determined that the shift duration has expired, control skips to step 345, where control is returned to the main program (not shown). It should be appreciated that any known method for real-time tracking of the shift duration is within the scope of this invention.

In step 320, the controller 132 determines a speed differential between a desired engine speed and the actual engine speed. The desired engine speed may be input via the control lever mechanism 134, and the actual engine speed may be sensed by the engine speed sensor 142. Control then continues to step 325.

Then, in step 325, the controller 132 determines a speed offset based on the load condition of the transmission and/or the shift being performed, and control proceeds to step 330. In step 330, the controller 132 determines a modified speed differential by adding the speed offset to the speed differential. Control proceeds to step 335.

In step 335, the controller 132 determines a modified fuel torque limit, a modified timing, and/or a modified rail pressure based on the load condition of the transmission and/or the shift being performed, and control proceeds to step 340. In step 340, the controller 132 determines an amount of fuel to be delivered to the engine 112 in response to the modified speed differential, the modified timing, and/or the modified rail pressure, as limited by the modified fuel torque limit. It should be appreciated that the amount of fuel to be delivered to the engine 112 may also be limited by other factors such as, for example, a smoke rack limit to prevent emissions of black smoke that result from too rich of an air/fuel mixture. Control then returns to step 315.

Optionally, the shift operation 300 may include an auto-shutoff feature. For example, as shown in broken lines in FIG. 3, control may proceed from step 320 to step 322. In step 322, the controller 132 determines whether the speed differential is less than a predetermined speed differential. If, in step 322, it is determined that the speed differential is less than the predetermined speed differential, control skips to step 345, where control is returned to the main program (not shown). Otherwise, if it is determined in step 322 that the speed differential is not less than the predetermined speed differential, control continues to step 325.

The shift operation 300 with auto-shutoff feature may produce a different engine speed response curve than a system without auto-shutoff. For example, FIG. 4 illustrates engine speed response over the time period of a shift transition. Shift initiation occurs at a time, $T_I$, before the off-going clutch begins disengagement and before the oncoming clutch begins engagement.

At or after shift initiation, the desired speed is modified by the speed offset to generate a desired engine speed with offset. As shown, the engine speed may exceed the desired engine speed for a period of time before dropping below the desired engine speed for much of the shift transition. Toward the end of the shift transition in a system without the auto-shutoff feature, the speed offset may be ramped down beginning at a predetermined time, for example, $T_M$, that provides a maximum duration for effectuating speed offset. In the system without auto-shutoff, the engine speed may exceed, or overshoot, the desired engine speed toward the end of the shift transition.

In a system with the auto-shutoff feature, the engine response may overshoot the desired engine speed by a lesser amount than the system without auto-shutoff. A system employing the auto-shutoff feature may begin ramping down the speed offset once the difference between engine speed and desired engine speed (i.e., desired engine speed without speed offset) reaches a predetermined difference, for example, $X_{RPM}$. At the time, $T_A$, where the difference reaches the predetermined difference, $X_{RPM}$, the speed offset may be ramped down, as indicated by the broken line in FIG. 4. As a result, the engine speed may reach the desired engine speed with little or no overshoot, as shown by the dashed engine response curve in FIG. 4.

It should be appreciated that the ramp-up rate, ramp-down rate, duration of offset, maximum offset, and/or $X_{RPM}$ can be altered to provide optimum results for one or more operating conditions such as, for example, the shift being performed, vehicle type, load condition, altitude, and terrain. The optimum results may be determined through testing of the system under the various operating conditions.

Figure 6A:
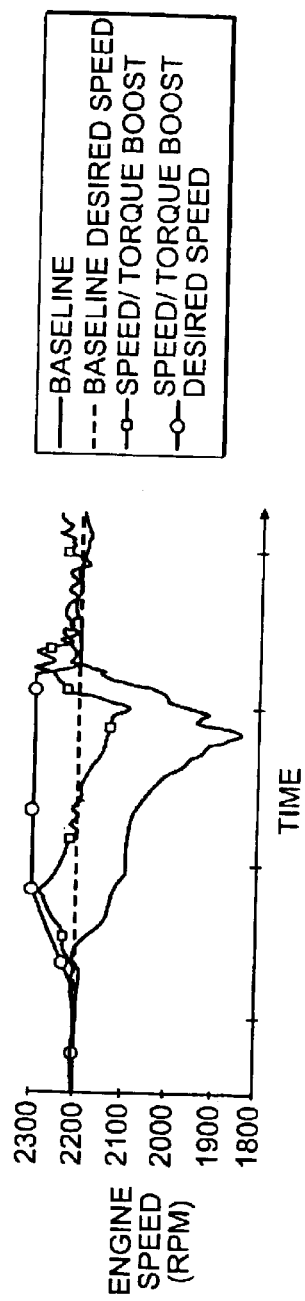
FIGS. 6A and 6B are graphs illustrating operation of an exemplary power management system at the same engine speed and shift ranges, but having two different engine loads.
Figure 6B:
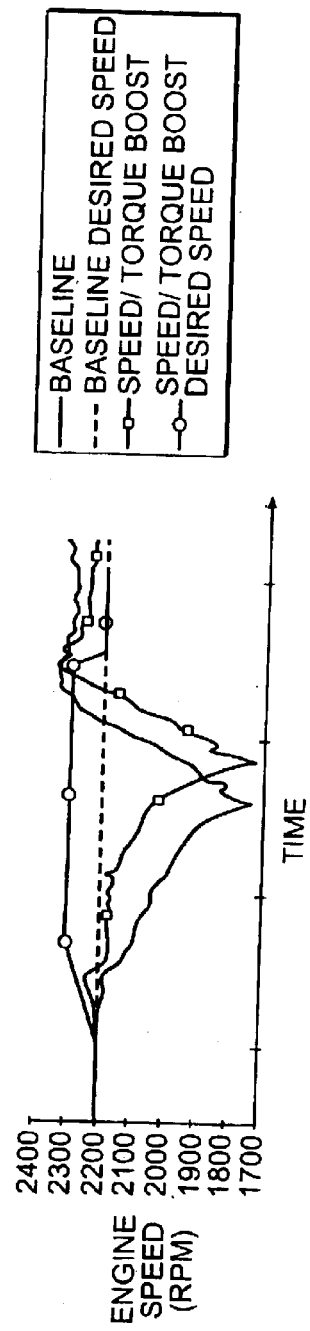

FIGS. 6A and 6B illustrate engine responses operating under an exemplary power management system at the same engine speed and shift ranges, but having two different engine loads. These figures are discussed in more detail below.

Industrial Applicability

A vehicle operator may input a desired engine speed via a control lever mechanism 134. Based on the input, the engine and transmission controller 132 may determine that a transmission shift, for example, a 13-to-12 downshift, a 7-to-6 downshift, or the like, is to occur. Initiation of the shift may precede disengagement of the off-going clutch and engagement of the oncoming clutch.

After initiation of the shift, the controller 132 may modify the desired engine speed, or the difference between desired engine speed and actual engine speed, by a speed offset. The speed offset may be determined based on the engine load and/or the shift being performed, in this example, a 5-to-4 downshift. The controller may also substitute modified engine control maps, for example, a modified rail pressure map, a modified timing map, and/or a modified torque limit map, for the standard maps. Exemplary modified maps are shown in FIGS. 5A, 5B, and 5C.

The rail pressure map is associated with fuel injection pressure. The modified rail pressure map shown in FIG. 5A may increase the desired rail pressure to a desired limit. By increasing the injection pressure, the level of exhaust smoke may be reduced, and combustion may be more efficient, which may produce more engine power for a given amount of fuel injected. The rail pressure map may ramp up from, for example, about 19 Mpa (2750 psi) at low engine speeds to about 24.5 Mpa (3550 psi) at higher speeds in order to limit the high rates of in-cylinder pressure rise that may be associated with high injection pressures at low engine speeds.

An example of the modified fuel injection timing map is shown in FIG. 5B. The large flat region that dominates the map may be a conservative fuel injection timing of, for example, about eight degrees before top-dead-center (8°BTDC). This timing may represent a compromise between a timing that produces the maximum power for a given fueling and a timing that provides sufficient exhaust heat energy to the turbocharger to help accelerate the turbocharger and provide boost pressure more quickly.

As the fueling approaches the torque limit (i.e., maximum fueling), the timing may be advanced considerably. The timing may be determined in an engine test cell and may maximize cylinder pressure to the design limit of the engine 112. By running the engine 112 at the maximum cylinder pressure, the efficiency of the engine 112 may be optimized and the maximum power may be produced for the given fueling.

Another possible advantage of advancing the fuel injection timing at high engine loads is that the energy to the turbocharger may be reduced significantly, which may help to minimize the turbocharger speed. Without a significant advance in timing, the turbocharger speed limit could well exceed the operational limit and could ultimately cause premature failure of turbocharger components. By advancing the timing, the turbocharger speed may be reduced and the system 100 may retain its desired capability. For example, turbocharger speed generally increases with altitude. Thus, reducing the turbocharger speed by advancing the timing may counteract the increased speed caused by altitude, and the system 100 may retain its desired capability even at altitude.

In addition, the speed of the transition from normal engine operation to the modified operation during shifting may be slowed noticeably by the speed at which the electronic governor could increase the fueling. If the governor gains were changed greatly to produce the desired response, there may be a risk of instability. By advancing the timing, the desired engine power required for the modified operation during shifting may be achieved with a lower fueling. Thus, the governor may only have to increase the fueling far less than would be necessary with an unmodified timing.

Referring to FIG. 5C, the power management system may use a third modified map to determine the torque limit (i.e., the maximum fueling available) for the modified operation during shifting. Used in conjunction with the modified timing and rail pressure maps, the modified torque limit map may provide a hard limit to the fueling allowed at any given engine speed.

FIGS. 6A and 6B illustrate exemplary results from an engine employing a power management system 100 and control system 200 in accordance with the invention and from an engine without the power management system 100 and control system 200. FIG. 6A shows the baseline results for an unloaded engine 112 operating at a given engine speed. FIG. 6B shows the results for an engine 112 experiencing a drawbar load of 20,000 lbs. at the same given engine speed.

A power management system in accordance with exemplary embodiments of the invention may reduce wear to driveline components and prevent the engine from lugging and/or stalling. The power management system may also achieve acceptable shift quality by minimizing shift acceleration and delay, while ensuring that the acceleration, delay, and engine response during shifting meet with operator expectations.

It will be apparent to those skilled in the art that various modifications and variations can be made in the disclosed power management system without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A power management system, comprising:
   a power source;
   a transmission including a drive member and at least two shift ranges, the drive member of the transmission being driveably engaged with the power source; and
   a control system in communication with the power source and the transmission, the control system being operative to cause a shift transition between the at least two shift ranges in response to a shift command,
   wherein the control system is operative to modify, during at least a portion of the shift transition, at least one of a speed of the power source and a speed of the drive member based on a load condition of the power source.

2. The system of claim 1, wherein the control system is configured to increase the speed of the drive member during at least a portion of the shift transition based on at least one of a load condition of the power source, a speed of the power source, and the at least two shift ranges.

3. The system of claim 1, wherein the control system is configured to increase the speed of the power source during at least a portion of the shift transition based on at least one of a load condition of the power source, a speed of the power source, and the at least two shift ranges.

4. The system of claim 3, wherein the control system is configured to increase the speed of the power source by increasing fuel delivery to the power source during at least a portion of the shift transition based on at least one of a load condition of the power source, a speed of the power source, and the at least two shift ranges.

5. The system of claim 4, wherein the control system is configured to receive an input indicating a desired speed of the power source, and
   wherein the control system is configured, during at least a portion of the shift transition, to determine a speed offset based on at least one of a load condition of the power source, a speed of the power source, and the at least two shift ranges, to increase the desired speed by the speed offset, and to increase the fuel delivery to the power source based on the increased desired speed.

6. The system of claim 4, wherein the control system is configured to increase a fuel torque limit on the fuel delivery to the power source during at least a portion of the shift transition based on at least one of a load condition of the power source, a speed of the power source, and the at least two shift ranges.

7. The system of claim 6, wherein the control system is configured to increase fuel injection pressure of the fuel delivery during at least a portion of the shift transition based on at least one of a load condition of the power source, a speed of the power source, and the at least two shift ranges.

8. The system of claim 6, wherein the control system is configured to advance timing of the power source during at least a portion of the shift transition based on at least one of a load condition of the power source, a speed of the power source, and the at least two shift ranges.

9. The system of claim 1, wherein the power source includes an engine, the transmission includes an automatic transmission.

10. The system of claim 1, wherein the control system includes at least one controller.

11. The system of claim 1, wherein the power management system is associated with a vehicle, and wherein the load condition of the power source includes at least one of drawbar load and rolling resistance of the vehicle.

12. A method for operating a power management system, comprising:
    driving a transmission with a power source, the transmission having at least two shift ranges;
    controllably shifting between the at least two shift ranges in response to a shift command; and
    modifying, during at least a portion of the shift transition, at least one of a speed of the power source and a speed of the drive member based on a load condition of the power source.

13. The method of claim 12, wherein said modifying includes increasing the speed of the drive member during at least a portion of said shifting based on at least one of a load condition of the power source, a speed of the power source, and the at least two shift ranges.

14. The method of claim 12, wherein said modifying includes increasing the speed of the power source during at least a portion of said shifting based on at least one of a load condition of the power source, a speed of the power source, and the at least two shift ranges.

15. The method of claim 14, wherein said increasing the speed of the power source includes increasing fuel delivery to the power source during at least a portion of said shifting based on at least one of a load condition of the power source, a speed of the power source, and the at least two shift ranges.

16. The method of claim 15, further including
    receiving an input indicating a desired speed of the power source;
    determining, during at least a portion of the shift transition, a speed offset based on at least one of a load condition of the power source, a speed of the power source, and the at least two shift ranges;
    increasing the desired speed by the speed offset during at least a portion of the shift transition; and
    increasing the fuel delivery to the power source based on the increased desired speed during at least a portion of the shift transition.

17. The method of claim 15, further including increasing a fuel torque limit on the fuel delivery to the power source during at least a portion of said shifting based on at least one of a load condition of the power source, a speed of the power source, and the at least two shift ranges.

18. The method of claim 17, further including increasing fuel injection pressure of the fuel delivery during at least a portion of said shifting based on at least one of a load condition of the power source, a speed of the power source, and the at least two shift ranges.

19. The method of claim 17, further including advancing timing of the power source during at least a portion of said shifting based on at least one of a load condition of the power source, a speed of the power source, and the at least two shift ranges.

20. A vehicle having a power management system, comprising:

an engine;

a transmission including a countershaft and at least two shift ranges, the countershaft of the transmission being driveably engaged with the engine;

at least one controller in communication with the engine and the transmission, the at least one controller being operative to cause a shift transition between the at least two shift ranges in response to a shift command, wherein the at least one controller is operative, during at least a portion of the shift transition, to increase net torque available to the countershaft by increasing the speed of the engine, the at least one controller being operative, during at least a portion of the shift transition, to increase the speed of the engine by increasing fuel delivery to the engine and increasing a fuel torque limit on the fuel delivery based on a load condition of the engine.

* * * * *